(12) United States Patent
Lee et al.

(10) Patent No.: US 9,374,547 B2
(45) Date of Patent: Jun. 21, 2016

(54) INPUT APPARATUS, DISPLAY APPARATUS, AND CONTROL METHODS THEREOF

(71) Applicant: SAMSUNG ELECTRONICS CO., LTD., Suwon-si (KR)

(72) Inventors: Myoung-jun Lee, Bucheon-si (KR); Hyun-kyu Yun, Seoul (KR); Joon-hyun Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/200,608

(22) Filed: Mar. 7, 2014

(65) Prior Publication Data
US 2014/0253815 A1    Sep. 11, 2014

(30) Foreign Application Priority Data

Mar. 7, 2013    (KR) .................. 10-2013-0024549

(51) Int. Cl.
*H04N 5/44* (2011.01)
*G06F 3/0488* (2013.01)
*H04N 21/422* (2011.01)
(Continued)

(52) U.S. Cl.
CPC .......... *H04N 5/4403* (2013.01); *G06F 3/04883* (2013.01); *H04N 21/4221* (2013.01); *H04N 21/42224* (2013.01); *H04N 21/4312* (2013.01); *H04N 21/482* (2013.01); *H04N 21/4852* (2013.01)

(58) Field of Classification Search
CPC ... H04N 5/4403; H04N 5/44; H04N 21/4221; H04N 21/42224; H04N 21/4312; H04N 21/482; H04N 21/4852; H04N 3/04883

USPC ......... 348/734, 731, 510, 589, 114, 564, 569; 345/173, 180, 182, 184, 169, 156, 179
See application file for complete search history.

(56) References Cited

U.S. PATENT DOCUMENTS 5,272,470 A * 12/1993 Zetts .............................. 345/173
5,917,475 A *  6/1999 Kuzunuki et al. ............. 345/173
(Continued)

FOREIGN PATENT DOCUMENTS

JP         2013-4095 A      1/2013
KR   10-2009-0074656 A      7/2009
(Continued)

OTHER PUBLICATIONS

Search Report dated Jun. 16, 2014, issued by the International Searching Authority in counterpart International Application No. PCT/KR2014/001866.
(Continued)

*Primary Examiner* — Trang U Tran
(74) *Attorney, Agent, or Firm* — Sughrue Mion, PLLC

(57) ABSTRACT

A display apparatus is provided. The display apparatus includes a communicator configured to communicate with an input apparatus comprising a touch pad, and receive coordinate data corresponding to a dragging trajectory input through the touch pad. The display apparatus also includes a display configured to display the dragging trajectory on a screen based on the received coordinate data; and a controller configured to recognize a number or character corresponding to the dragging trajectory based on the received coordinate data, and provide visual feedback adjusting the displayed dragging trajectory according to a recognition result.

10 Claims, 16 Drawing Sheets

(51) Int. Cl.
*H04N 21/431* (2011.01)
*H04N 21/482* (2011.01)
*H04N 21/485* (2011.01)

(56) References Cited

U.S. PATENT DOCUMENTS

| | | | |
|---|---|---|---|
| 5,943,044 A * | 8/1999 | Martinelli et al. | 345/174 |
| 8,094,941 B1 | 1/2012 | Rowley et al. | |
| 2004/0141649 A1 | 7/2004 | Landstad et al. | |
| 2008/0111710 A1 | 5/2008 | Boillot | |
| 2010/0169842 A1 | 7/2010 | Migos | |
| 2010/0277337 A1 * | 11/2010 | Brodersen et al. | 340/825.22 |
| 2011/0288997 A1 | 11/2011 | McBride | |
| 2011/0310021 A1 | 12/2011 | Choi et al. | |
| 2012/0030619 A1 | 2/2012 | Lee et al. | |
| 2012/0139859 A1 | 6/2012 | Ohira et al. | |
| 2012/0262370 A1 | 10/2012 | Ko et al. | |
| 2012/0320198 A1 | 12/2012 | Yasutake | |

FOREIGN PATENT DOCUMENTS

| | | |
|---|---|---|
| KR | 10-2012-0012115 A | 2/2012 |
| WO | 0115437 A1 | 3/2001 |
| WO | 2010/095769 A1 | 8/2010 |

OTHER PUBLICATIONS

Written Opinion dated Jun. 16, 2014, issued by the International Searching Authority in counterpart International Application No. PCT/KR2014/001866.

Communication dated Mar. 22, 2016, issued by the European Patent Office in counterpart European Application No. 14158197.5.

* cited by examiner

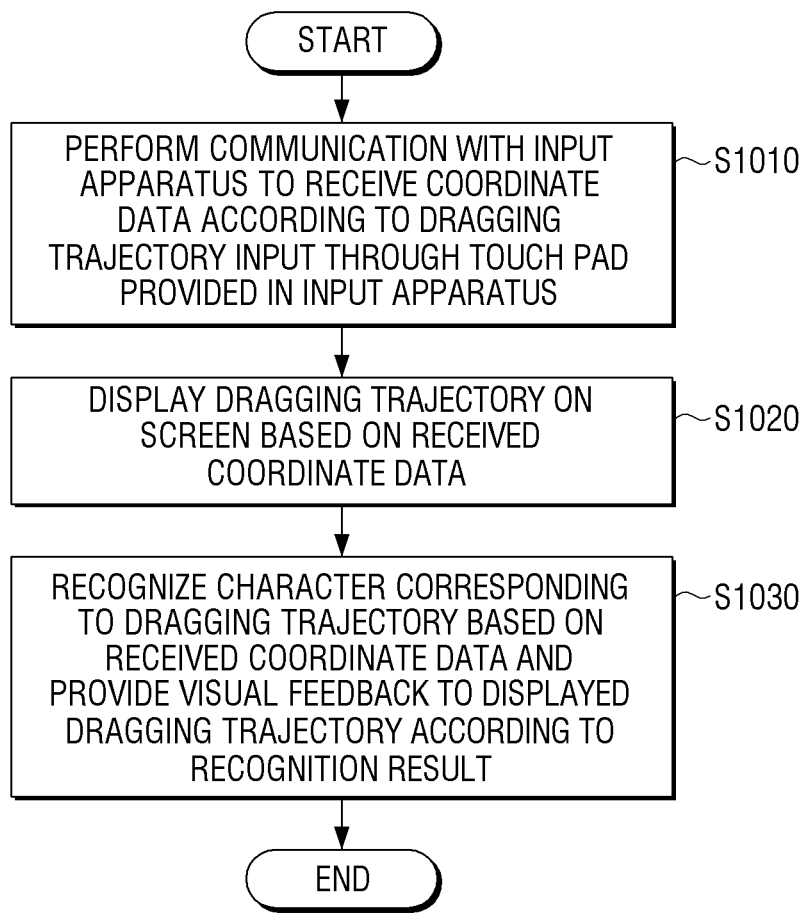

INPUT APPARATUS, DISPLAY APPARATUS, AND CONTROL METHODS THEREOF

CROSS-REFERENCE TO RELATED APPLICATION

This application claims priority from Korean Patent Application No. 10-2013-0024549, filed in the Korean Intellectual Property Office on Mar. 7, 2013, the disclosure of which is incorporated herein by reference in its entirety.

BACKGROUND

1. Field

Apparatuses and methods consistent with exemplary embodiments relate to an input apparatus, a display apparatus, and control methods thereof, and more particularly, to an input apparatus performing an input using a touch and drag method, a display apparatus, and control methods thereof.

2. Description of the Related Art

In recent years, a minimalist trend has influenced the designs of televisions (TVs) and other accessories. For example, a narrower bezel has been employed in the TVs to provide a design without superfluous display framing. Another example includes providing a simpler design by removing as many buttons as possible when employing a remote controller design.

When a number key that occupies a large area, which is configured to perform functions such as channel selection, is removed there may then be a hindrance in an ability to change channels. Accordingly, various methods for removing the possible hindrance have been attempted. For example, there is a method for changing a channel that works by showing an on screen key which may be navigated to and then clicked which will change the channel to a corresponding number of the screen key. However, it may be considered quite cumbersome to press a direction key several times in order to achieve a placement which allows one to click a numerical key pad on a screen.

A method of changing a channel through a handwritten input of a number has been discussed. However, when there is no visual effect indicating completion of a number (or character) input, it is not easy for a user to predict a next number input timing when two or more digits are input. Further, a user who is habituated to handwriting recognition by a tablet, personal computer (PC), or by a stylus pen or the like may scrawly write several numbers (or characters) to be input simultaneously, but then a recognition rate is degraded.

There are several types of erroneous input possibilities when the user inputs a number (or a character) by handwriting the input as compared with a button type input. For example, there may be an erroneous input due to an input speed difference, and when a user inputs the number (or the character) through a touch pad without watching a screen in which an input trajectory and a recognized number (or character) are illustrated, the user cannot know whether or not the input character is correctly recognized.

Further, when handwriting is input through a touch pad of a remote controller, the user does not only grasp the remote controller with one hand and handwrite a character with a thumb of the hand but may also grasp the remote controller with one hand and handwrites a character with an index finger of the other hand. Accordingly, there are many cases in which the user imagines a finger's trajectory recognized with his/her eyes arbitrarily by watching not a TV screen but an input pad. At this time, the user mainly watches the screen after input completion to check the input. When two or more same numbers (or characters) are input or when a specific number (or character) is illegible and then missed, the user cannot know the missed character which may cause inconvenience.

SUMMARY

According to an aspect of an exemplary embodiment, there is provided a display apparatus, including a communicator configured to communicate with an input apparatus including a touch pad, and receive coordinate data corresponding to a dragging trajectory input through the touch pad, a display configured to display the dragging trajectory on a screen based on the received coordinate data, and a controller configured to recognize a number or character corresponding to the dragging trajectory based on the received coordinate data, and provide visual feedback adjusting the displayed dragging trajectory according to a recognition result.

The controller may be further configured to provide different visual feedback when the dragging trajectory is recognized as the character or number, and when the dragging trajectory is not recognized as the character or number.

The controller may be further configured to gradually reduce the displayed size of the dragging trajectory, and sequentially move a display location of the dragging trajectory on the screen in response to the dragging trajectory being recognized as the character or number.

The controller may be further configured to display the dragging trajectory at a final location at which the dragging trajectory is displayed in a preset font form.

The controller may be further configured to provide a graphic effect in a form in which the displayed dragging trajectory gradually disappears dispersedly in response to the dragging trajectory not recognized as the character or number.

The controller may be further configured to perform a preset function based on the recognized character or number in response to the dragging trajectory being recognized as the character or number.

The preset function may include at least one from among a channel change, a character input, a menu execution, a mode change, and a volume adjustment.

According to an aspect of another exemplary embodiment, there is provided an input apparatus, including a communicator configured to perform communication with a display apparatus, a sensor configured to sense a touch operation input on a touch pad, and a controller configured to calculate coordinate data corresponding to a dragging trajectory in response to a location touched on the touch pad being dragged, and control the transmitting of the calculated coordinate data to the display apparatus.

The controller may be further configured to calculate, within a preset time, the coordinate data corresponding to the dragging trajectory from a first point at which a first touch is made to a second point at which a touch is completed.

The input apparatus may be a remote control apparatus configured to remotely control the display apparatus.

According to an aspect of another exemplary embodiment, there is provided a method of controlling a display apparatus. The method includes performing communication with an input apparatus, receiving coordinate data that corresponds to a dragging trajectory that is input on a touch pad provided in the input apparatus, displaying the dragging trajectory on a screen of the display apparatus based on the coordinate data, recognizing and generating a recognition result of at least one of a character and number corresponding to the dragging trajectory based on the received coordinate data, and providing visual feedback corresponding to the displayed dragging trajectory based on the recognition result.

The providing of the visual feedback may include providing different visual feedback when the dragging trajectory is either recognized as the character or number and when the dragging trajectory is not recognized as the character or number.

The providing of the visual feedback may further include gradually reducing the displayed size of the dragging trajectory, and sequentially moving a display location in response to the dragging trajectory being recognized as the character or number.

The providing of the visual feedback may further include displaying the dragging trajectory at a final location at which the dragging trajectory is displayed in a preset font form.

The providing of the visual feedback may further include providing a graphic effect in a form in which the displayed dragging trajectory gradually disappears dispersedly in response to the dragging trajectory not being recognized as the character or number.

The method may further include performing a preset function based on the recognized character or number in response to the dragging trajectory being recognized as the character or number.

The preset function may include at least one from among a channel change, a character input, a menu execution, a mode change, and a volume adjustment.

According to an aspect of another exemplary embodiment, there is provided a method of controlling an input apparatus that performs communication with a display apparatus, the method including sensing a touch operation input on a touch pad, calculating coordinate data corresponding to a dragging trajectory in response to a location touched on the touch pad being dragged, and transmitting the calculated coordinate data to the display apparatus.

The calculating of the coordinate data may further include calculating, within a preset time, the coordinate data corresponding to the dragging trajectory from a first point in which a first touch is made to a second point in which a touch is completed.

The input apparatus may be a remote control apparatus configured to remotely control the display apparatus.

BRIEF DESCRIPTION OF THE FIGURES

The above and/or other aspects will be more apparent by describing in detail exemplary embodiments, with reference to the accompanying drawings, in which:

FIG. 10 is a flowchart illustrating a control method of a display apparatus according to an exemplary embodiment.

DETAILED DESCRIPTION OF THE EXEMPLARY EMBODIMENTS

Figure 1:
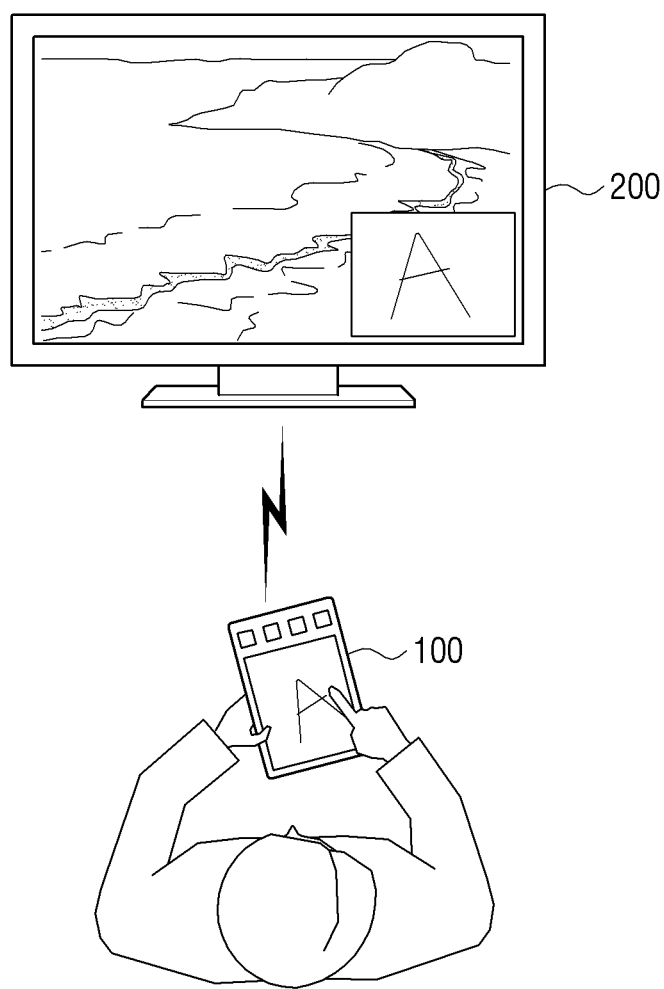
FIG. 1 is a schematic diagram illustrating a display system according to an exemplary embodiment.

Hereinafter, exemplary embodiments will be described in more detail with reference to the accompanying drawings.

In the following description, the same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail because they would obscure the exemplary embodiments with unnecessary detail.

FIG. 1 is a schematic diagram illustrating a configuration of a display system according to an exemplary embodiment.

An input apparatus 100 may include a touch panel configured to sense a touch of a user, and may be further configured to transmit information corresponding to the sensed touch to a display apparatus 200.

Here, the input apparatus 100 may be any one of the known products that uses touch sensors such as a remote control apparatus configured to control the display apparatus 200, a control apparatus connected to the display apparatus 200 in a wired manner, a portable phone, a personal digital assistant (PDA), or an electronic notebook.

The display apparatus 200 may function to display information on a screen corresponding to a user touch received from the input apparatus 100. The user touch may be a touch by various touchable objects such as a fingertip of a user as well as a pen.

The display apparatus 200 may be implemented as a digital TV, a personal computer (PC) monitor, or the like, but is not limited thereto. Any apparatus configured to perform a display function such as a digital information display (DID) panel may be implemented.

Hereinafter, detailed operations of the input apparatus 100 and the display apparatus 200 will be described with reference to the accompanying drawings.

Figure 2A:
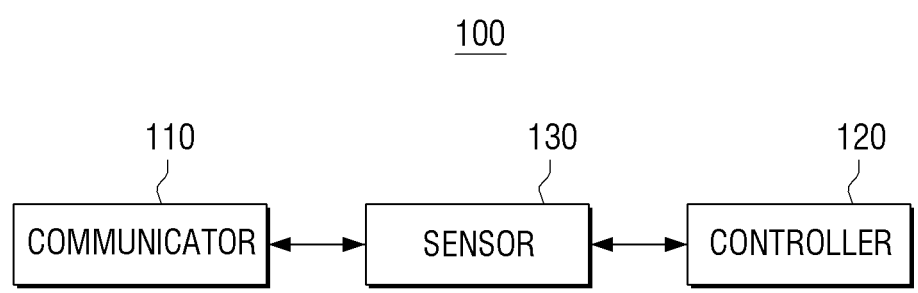
FIG. 2A is a block diagram illustrating a configuration of an input apparatus according to an exemplary embodiment.

FIG. 2A is a block diagram illustrating a configuration of an input apparatus according to an exemplary embodiment.

Referring to FIG. 2A, the input apparatus 100 may include a sensor 130, a controller 120, and a communicator 110.

The communicator 110 may be configured to perform communication with the display apparatus (for example, see display 200 of FIG. 1).

Specifically, the communicator 110 may transmit information corresponding to a touch sensed through the sensor 130 to the display apparatus 200.

The communicator 110 may use any one or number of communication methods, such as Bluetooth (BT), Internet, a local area network (LAN), wireless Fidelity (WiFi), Near Field Communication (NFC), radio frequency (RF), Ethernet, Transmission Control Protocol/Internet Protocol (TCP/IP), Internetwork Package Exchange (IPX), Firewire, Institute of Electrical and Electronic Engineers (IEEE) 1394, iLink, Code Division Multiple Access (CDMA), Time Division Multiple Access (TDMA), High Definition Multimedia Interface-Consumer Electronics Control (HDMI-CEC), wireless HDMI-CEC, and Radio Frequency Identification (RFID) Tag, to communicate with the display apparatus 200.

The sensor 120 may include a touch pad to sense a touch.

The touch panel may include a touch sensor and a signal converter. The touch sensor may sense generation of a touch, drag, and drop from changes in physical properties that are measured, for example, resistance, capacitance, or the like.

The touch pad may include multiple layers. For example, a layer which a finger or a pen is directly touched, a layer in which a horizontal electrode rod and a vertical electrode rod are formed in a grid form, and a connected circuit plate layer. A location in which the finger or pen is first touched is recorded and may continuously recognize movement of the finger or pen. Particularly, the layer in which the electrode rod is formed is charged by certain alternating current (AC), and when the finger or pen reaches the electrode rod grid, current is blocked and the current blocking is sensed by a circuit plate.

The touch pad may be implemented with a capacitive type or a resistive type sensor or sensor array. Specifically, the capacitive type touch pad is a touch panel that senses fine electricity changes excited by a touch by a part of the human body of a user. Particularly, the capacitive type touch pad uses a dielectric coated on a surface of the touch panel and calculates a touch coordinate when a portion of the body of the user is touched on the surface of the touch panel. Alternatively, the resistive type touch panel is a touch panel that may include two embedded electrode plates, and may therefore sense current flow through contact between upper and lower plates at a touch point and calculates a touch coordinate when the user touches a surface of the touch panel. Further, in accordance with another at least one or more exemplary embodiments, an infrared sensing method, a surface acoustic wave method, an integral strain gauge method, a piezoelectric effect method, and the like may be used to sense a touch operation as well.

In some cases, the sensor 130 may include a proximity sensor and sense a motion which is not in direct contact with a pad surface but rather only approaches the pad surface coming within a close enough proximity to allow the proximity sensor to sense the presence of the user contact element, be that a stylus, finger, or the like.

The controller 120 functions to control an overall operation of the input apparatus 100. The controller 120 may include a module configured to control a central processing unit (CPU) and the input apparatus 100 and a read only memory (ROM) and a random access memory (RAM) configured to store data.

In particular, the controller 120 may calculates coordinate data according to a dragging trajectory when a location touched on a touch pad is dragged. Here, term "dragging" means an operation which moves a location by dragging a touched point in a state in which the point is touched. The "dragging trajectory" may be various kinds of shapes which allow an error of a user according to an arbitrary path of the user, such as a linear shape, a free curved shape, a parabolic shape, a circular shape, a tetragonal shape, or a diamond shape.

Specifically, the controller 120 may calculate coordinate data according to a dragging trajectory from a point in which a first touch is made to a point in which a touch is completed within a preset time. That is, when a touch by dragging is continuously made and when the touch by dragging is input within the preset time even when the touch by dragging is not continuously made.

The controller 120 may not recognize the plurality of dragging trajectories as one dragging trajectory but may calculate coordinate data for each of the plurality of dragging trajectories. This detection of a plurality of dragging trajectories may be used to recognize one character based on the plurality of dragging trajectories which may be displayed on the display apparatus 200 and may correspond to a possible selection option available to a user on the display apparatus 200. For example, the display apparatus may apply a plurality of dragging trajectories to recognize one character when the plurality of dragging trajectory are input within a preset time.

Specifically, according to an exemplary embodiment, the controller 120 may calculate a touch coordinate value at a touch location on a touch panel when a touch occurs. For example, the controller 120 may calculate an arithmetic average value from a plurality of temporary coordinate values, and may store the calculated arithmetic average value as a touch coordinate value. Further, when dragging occurs from the touch position, the controller 120 may extract a temporary coordinate value at a location closest to the touch coordinate value among the plurality of temporary coordinate values in a touch region of a drag path. That is, the controller 120 may detect the plurality of temporary coordinate values in a touch region and then calculates a coordinate change value from each of the plurality of temporary coordinate values detected from the touch coordinate value. The controller 120 may extract a temporary coordinate value having a minimum coordinate change value, and may update the touch coordinate value as the extracted temporary coordinate value. At this time, the controller 120 may initialize the touch coordinate value when drop occurs from the touch location at which a touch coordinate value is determined or the touch location of the drag path.

The controller 120 may further transmit the coordinate data calculated according to the touch operation to the display apparatus 200. In some cases, the touch pad may be implemented with a touch screen implemented to be integrated with a display. At this time, the touch screen may display a dragging trajectory input according to a touch operation of a user.

Figure 2B:
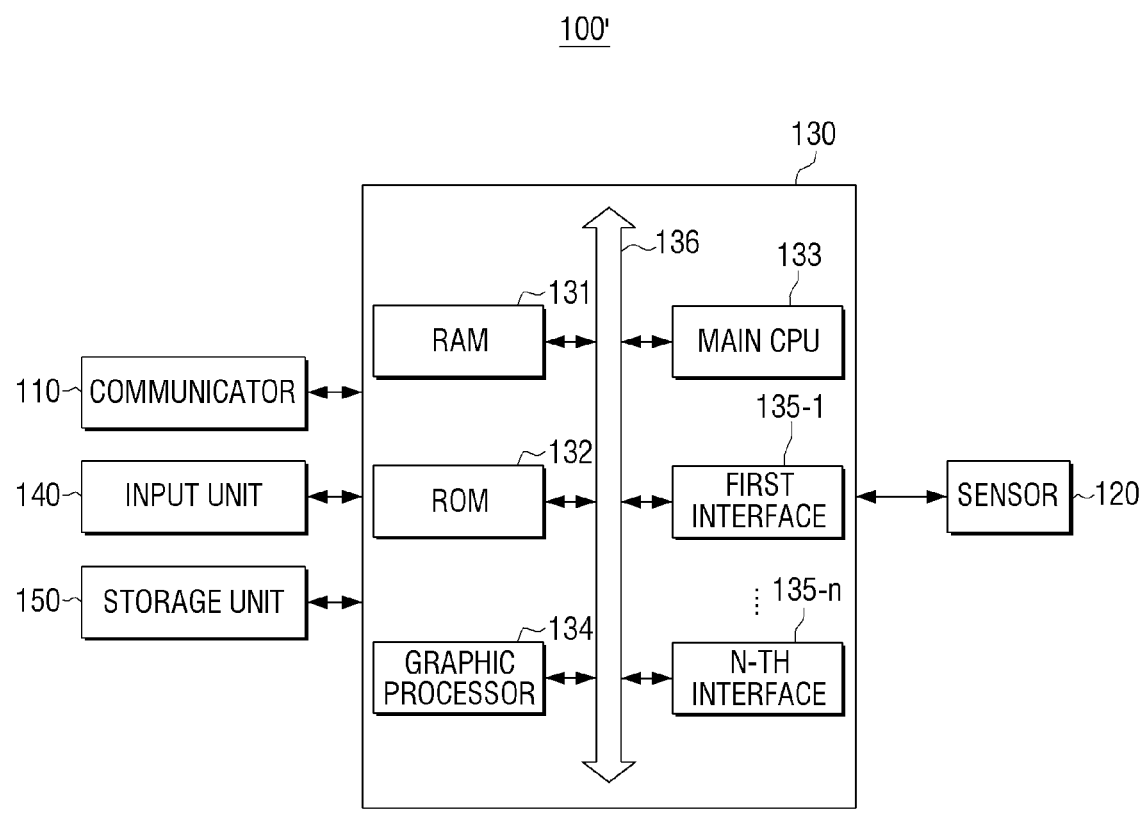
FIG. 2B is a block diagram illustrating a configuration of an input apparatus according to another exemplary embodiment.

FIG. 2B is a block diagram illustrating a configuration of an input apparatus according to another exemplary embodiment. Referring to FIG. 2B, an input apparatus 100' includes a communicator 110, a sensor 120, a controller 130, an input unit 140, and a storage unit 150.

Detailed description of portions of components illustrated in FIG. 2B overlapping the components of FIG. 2A will be omitted.

The controller 130 may include a random access memory (RAM) 131, a read only memory (ROM) 132, a main central processing unit (CPU) 133, a graphic processor 134, first to n-th interfaces 135-1 to 135-n, and a bus 136. Operations of the components are similar to those of components of a controller 230 illustrated in FIG. 3B, and thus detailed description thereof will be similar to that of the controller 230 in FIG. 3B.

The controller 130 may perform the above-described character recognition function. That is, the character recognition for the input touch trajectory may be performed in the display apparatus 200. In some cases, the character recognition for the input touch trajectory may be performed through the input apparatus 100. When the character recognition for the input touch trajectory is possible, the controller 130 may transmit information of the recognized character to the display apparatus 200, and when the character recognition for the input trajectory is impossible, the controller 130 may transmit error information to the display apparatus 200. When the error information indicating that the character recognition is impossible is received, the display apparatus 200 may display a message guiding corresponding content or output audio and allow the user to recognize the content.

The input unit 140 functions to receive various user commands.

Specifically, the input unit 140 may be provided with at least one button type of either a hard button or a soft button, for example, the input unit 140 may include a power button, an up/down button, and the like.

Further, the input unit 140 may include a mode change button configured to change an operation mode from a button input mode to a handwriting recognition mode. For example, when the mode change button is pressed, the controller 130 may transmit information (for example, flag information) indicating mode change to the display apparatus 200, and the display apparatus 200 which receives the information may display a screen on which a touch trajectory input through the input apparatus 100 is to be displayed, for example, an on screen display (OSD) screen. In some cases, only when the mode change button is pressed, thereby instructing input apparatus to enter the handwriting recognition mode, will the touch pad implement functionality able to receive the touch input of the user. That is, the mode change button may perform a lock function for a touch pad input.

However, this is merely exemplary, and the embodiment in which the input mode is changed in the input apparatus 100 may be implemented in various ways. For example, when a specific dragging trajectory is input through a touch pad, the controller may recognize the dragging trajectory as a mode change input, and transmit information (for example, flag information) indicating mode change to the display apparatus 200.

The storage unit 150 may drive the input apparatus 100, and may store various programs and data for control.

In particular, the storage unit 150 may store a module required to extract coordinate data for the input touch trajectory. Further, when the input apparatus 100 performs character recognition, the storage unit may further include a character recognition module.

Figure 3A:
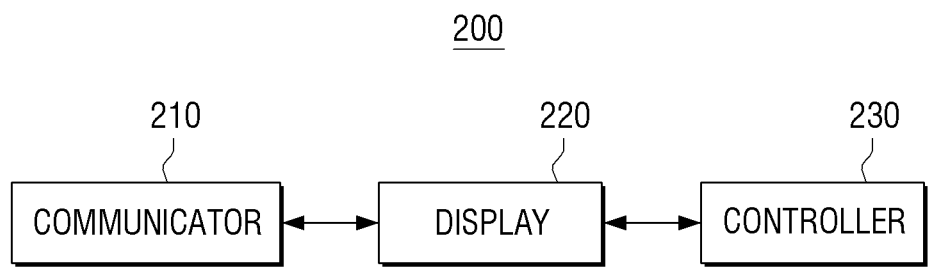
FIG. 3A is a block diagram illustrating a configuration of a display apparatus according to an exemplary embodiment.

FIG. 3A is a block diagram illustrating a configuration of a display apparatus according to an exemplary embodiment.

Referring to FIG. 3A, the display apparatus 200 may include a communicator 210, a display 220, and a controller 230.

The communicator 210 performs communication with the input apparatus 100 as shown in any of FIG. 1, 2A, or 2B.

In particular, the communicator 210 receives coordinate data according to a dragging trajectory input through a touch pad provided in the input apparatus 100.

The display 220 displays a dragging trajectory on a screen based on the received coordinate data according to control of the controller 230.

Specifically, the display 220 may display a touch trajectory according to a touch operation input on a touch panel of the input apparatus 100 on a screen as it is or correct the touch trajectory and display the corrected touch trajectory. For example, the display 220 may correct the touch trajectory to a smooth curve, and display the corrected touch trajectory.

At this time, the display 220 may display the touch trajectory within a preset display region. For example, the display 220 may display the touch trajectory within a preset region of a bottom right region of the screen, but this is not limited thereto. Further, the display region may be implemented with an OSD or pop-up type view, but this is not limited thereto.

The display 220 may be implemented with a liquid crystal display (LCD), an organic light emitting display (OLED), a plasma display panel (PDP), or the like.

The controller 230 is configured to control an overall operation of the display apparatus 200. The controller 230 may include a module configured to control a CPU and the display apparatus 200 and a ROM and a RAM configured to store data.

<Touch Trajectory Display>

The controller 230 may control the display 220 to display a touch trajectory within a preset region of a screen.

Specifically, the controller 230 may control the display 220 to display a corresponding trajectory based on received coordinate data from the input apparatus 100 or 100'.

For example, the controller 230 may control the display 220 to display a touch trajectory according to a touch operation based on the received coordinate data on the screen as it is or correct the touch trajectory and display the corrected touch trajectory. For example, the controller 230 may correct the touch trajectory to a smooth curve and display the corrected touch trajectory on the display 220.

When coordinate data corresponding to a dragging trajectory according to a second touch operation is received just after coordinate data corresponding to a dragging trajectory according to a first touch operation is received from the input apparatus 100, the controller 230 may control the display 220 to display the dragging trajectories so that the dragging trajectory according to the former received coordinate data and the dragging trajectory according to the later received coordinate data overlap. That is, the controller may display the dragging trajectories with a difference corresponding to an input time difference of the touch operations according to the dragging trajectories, and visual feedback according to the dragging trajectories may overlap to be applied when the time difference is very short. In some exemplary embodiments, after the visual feedback according to the former received coordinate data is completed, the controller 230 may display the visual feedback according to the later received coordinate data. For example, when the user inputs a character of two digits or more, as soon as one dragging trajectory is input from the input apparatus 100, the other dragging trajectory may be input. At this time, the display apparatus 200 may receive coordinate data according to two dragging trajectories within a preset time.

<Character Recognition>

The controller 230 may recognize a number or a character corresponding to a dragging trajectory based on coordinate data received from the input apparatus 100 through the communicator 210. Alternatively, the controller 230 may correct the received coordinate data, and recognize the number or character corresponding to the dragging trajectory based on the corrected coordinate data. For example, the controller 230 may remove coordinate data, and the like which are beyond a preset tolerance from the received coordinate data and recognize the number or character using the coordinate data which is in within the preset tolerance. Here, the character may be a visual symbol system for human communication and may be used as a meaning including all appointed texts such as a figure, Hangul, alphabet, Chinese character, a punctuation, a symbol, and the like. Hereinafter, for clarity, the number or character is collectively referred to as a character and will be described.

Specifically, the controller 230 may recognize the character corresponding to the received coordinate data through various character recognition methods such as pattern matching, structure analysis, feature matching, and stoke analysis.

The pattern matching may be including a feature extraction and a pattern matching portion. The feature extraction may analyze preset character data, and may extract unique features or patterns from the character data. The system has made a recognition target pattern as a standard pattern, and compares through pattern matching, the standard pattern with an input pattern, and determines the input pattern most similar to the standard pattern as a recognition result value.

<Visual Feedback According to Character Recognition Result>

The controller 230 may control visual feedback to be provided to a displayed dragging trajectory.

The controller 230 may provide different types of visual feedback according to a character recognition result, that is, character recognition result of the dragging trajectory. In some cases, the controller 230 may provide the visual feedback regardless of character recognition.

Specifically, the controller 230 may change a size, shape, location, and the like of the displayed dragging trajectory according to the character recognition result of the displayed dragging trajectory, and displays the changed result. Once recognized, the controller 230 may finally display the dragging trajectory as a preset font form. Here, the preset font means a writing style pre-stored in the display apparatus 200 and legible in the display apparatus 200.

According to an exemplary embodiment, when the dragging trajectory is recognized as a preset character, the controller 230 may display the displayed dragging trajectory while the controller 230 gradually reduce a size of the displayed dragging trajectory, and the finally displayed form may be the preset font form. Therefore, the user may directly recognize whether or not a corresponding dragging trajectory is recognized as a character.

When the dragging trajectory is recognized as a preset character, the controller 230 may display the dragging trajectory while gradually reducing the displayed dragging trajectory and sequentially moving a display location toward one side. For example, the controller 230 may display the dragging trajectory while gradually moving the display location of the dragging trajectory upward. Finally, the controller 230 may represent that a corresponding dragging trajectory is correctly recognized as a character by changing the dragging trajectory as a certain font form and displaying dragging trajectory as the font form. Further, the controller 230 may control a point of time when the dragging trajectory is first displayed and a point of time when the dragging trajectory is finally displayed in a certain font form to be within a preset time. A corresponding time interval may be set as default when a product is manufactured or may be directly changed and set through a separate menu by a user. For example, the time interval may be 0.5 to 1 second, but this is not limited thereto.

According to another exemplary embodiment, when the dragging trajectory is not recognized as a preset character, the controller 230 may provide a graphic effect in a form in which the displayed dragging trajectory dispersedly disappears after a specific time elapsed or directly disappears.

According to another exemplary embodiment, when the dragging trajectory is not recognized as the preset character, the controller 230 may provide visual feedback in which a residual image for the displayed dragging trajectory is left. Therefore, the user may recognize that the dragging trajectory is not recognized as the character.

According to another exemplary embodiment, the controller 230 may provide various types of feedback in which color or a size of the displayed dragging trajectory is changed according to the character recognition result, or a message for the character recognition result is displayed.

That is, the controller 230 may provide the various types of visual feedback sufficient to recognize the character recognition result by the user.

However, this is merely exemplary, and in some cases, the controller 230 may provide the same visual feedback regardless of the character recognition result. For example, the controller 230 may provide visual feedback in which the displayed dragging trajectory dispersedly disappears after a preset time elapsed or directly disappears. At this time, the dragging trajectory recognized as the character may be displayed in a separate region in a preset font form to feed back that the dragging trajectory is recognized as the character to the user.

The above-described various visual feedback types may be directly set by the user or may be implemented to be changed by a user among the pre-stored various visual feedback types.

According to one or more exemplary embodiments, the controller 230 may additionally display a dragging trajectory recognized as a character in a character write region different from a region in which a dragging trajectory is displayed in a preset font form, while a dragging trajectory not recognized as a character may not be displayed in the character write region. Therefore, the user may indirectly recognize whether or not the dragging trajectory is recognized as a character.

According to one or more exemplary embodiments, even when character recognition is performed, it may be implemented such that the corresponding character is input when the character is not directly input and there is preset feedback from the input apparatus 100. That is, the controller may recognize a character recognized when a specific touch trajectory such as "0 (zero)" is input from the input apparatus 100, or when a signal according to a specific button input provided in the input apparatus 100 is received, as a user's intended character, and complete character input. Therefore, even when the character recognition is performed, the controller 230 may prevent the recognized character from being input when the recognized character is not the user's intended character.

Alternatively, even when the character recognition is performed, it may be implemented that the corresponding character may not be directly input but input after a preset time elapsed. At this time, the input apparatus 100 may be implemented to receive an operation for deleting a character recognized before the preset time elapsed. For example, when the recognized character is not the user's intended character, the input apparatus 100 may be implemented to receive an "X" or "✱" operation from the user.

When the controller 230 receives new coordinate data from an input apparatus during a time when the controller is providing visual feedback and character recognition is being performed based on currently received coordinate data, the controller 230 may allow visual feedback for the new and the currently received coordinate data to overlap and to be provided. For example, in the visual feedback in which a dragging trajectory corresponding to each coordinate data is changed, the dragging trajectories may overlap and be displayed. Particularly, a former displayed dragging trajectory is first sequentially changed and displayed, and a latter displayed dragging trajectory is delayed by a difference between times when the dragging trajectories are input, changed, and disappear. In some cases, after the visual feedback for the former received coordinate data is completed, the controller may provide the visual feedback for the latter received coordinate data.

<Function Performance According to Recognized Character>

When character recognition is normally performed, the controller 230 may perform various functions such as channel change, volume adjustment, search word input, character input, menu execution, site movement, and specific mode entry using a recognition result value. Specifically, the controller 230 may perform a corresponding function after a preset time (for example, 1 to 2 seconds) elapsed from a character recognition point of time. Here, the character recognition point of time may be a point of time when the displayed dragging trajectory is displayed in a preset font form in the above-described example, but this is not limited thereto. That is, the controller 230 may perform the corresponding function after a preset waiting time elapsed from a point of time when the user can recognize that the character recognition was performed (that is, a point of time when the dragging trajectory is displayed in the preset font form). However, this is merely exemplary, and in another exemplary embodiment, the waiting time may be implemented to be forcibly removed by an input of a specific trajectory or a specific button, or the like, or implemented to be adjusted by in the user settings.

The controller 230 may perform a function corresponding to a recognized character based on screen information displayed before character recognition, a currently performed function, or the like. For example, a number may be recognized in a state in which a specific broadcasting channel is selected and displayed on a screen, the controller 230 may perform channel change to the broadcasting channel corresponding to the number. Another example is when the controller 230 may input the recognized character to the character input window in response to a character being recognized in a state in which a character input window (for example, a social network service (SNS) screen) is displayed on the screen before a signal according to a touch trajectory is received. Another example is when the controller 230 may execute a menu item corresponding to the recognized number in response to a number being recognized in a state in which an OSC menu including a plurality of menu items, in which numbers are used as identifiers, is displayed on the screen before the signal according to the touch trajectory is received.

Alternatively, the controller 230 may perform a function corresponding to the recognized character based on a preset signal received before character recognition. Specifically, the controller 230 may determine a type of a function to be performed based on a signal received from an input apparatus before a touch trajectory signal is received. For example, when a number is recognized after a signal corresponding to channel change is received from the input apparatus, the controller 230 may perform the channel change to a broadcasting channel corresponding to the recognized number.

According to another exemplary embodiment, when the character recognition is performed, the controller 230 may perform a corresponding function after a preset time elapsed. As an example, when a specific number is recognized in a state in which a specific broadcasting channel is selected and displayed, the controller 230 may change the broadcasting channel to a channel corresponding to the recognized number after the preset time elapsed.

Alternatively, when a preset confirm signal is received after the character recognition is normally performed, the controller 230 may perform a corresponding function. For example, when the number "7" is recognized in a state in which a specific broadcasting signal is selected and displayed, and the confirm signal for confirming the character recognition is received, the controller 230 may perform the channel change to the broadcasting channel corresponding to the recognized number "7".

Figure 3B:
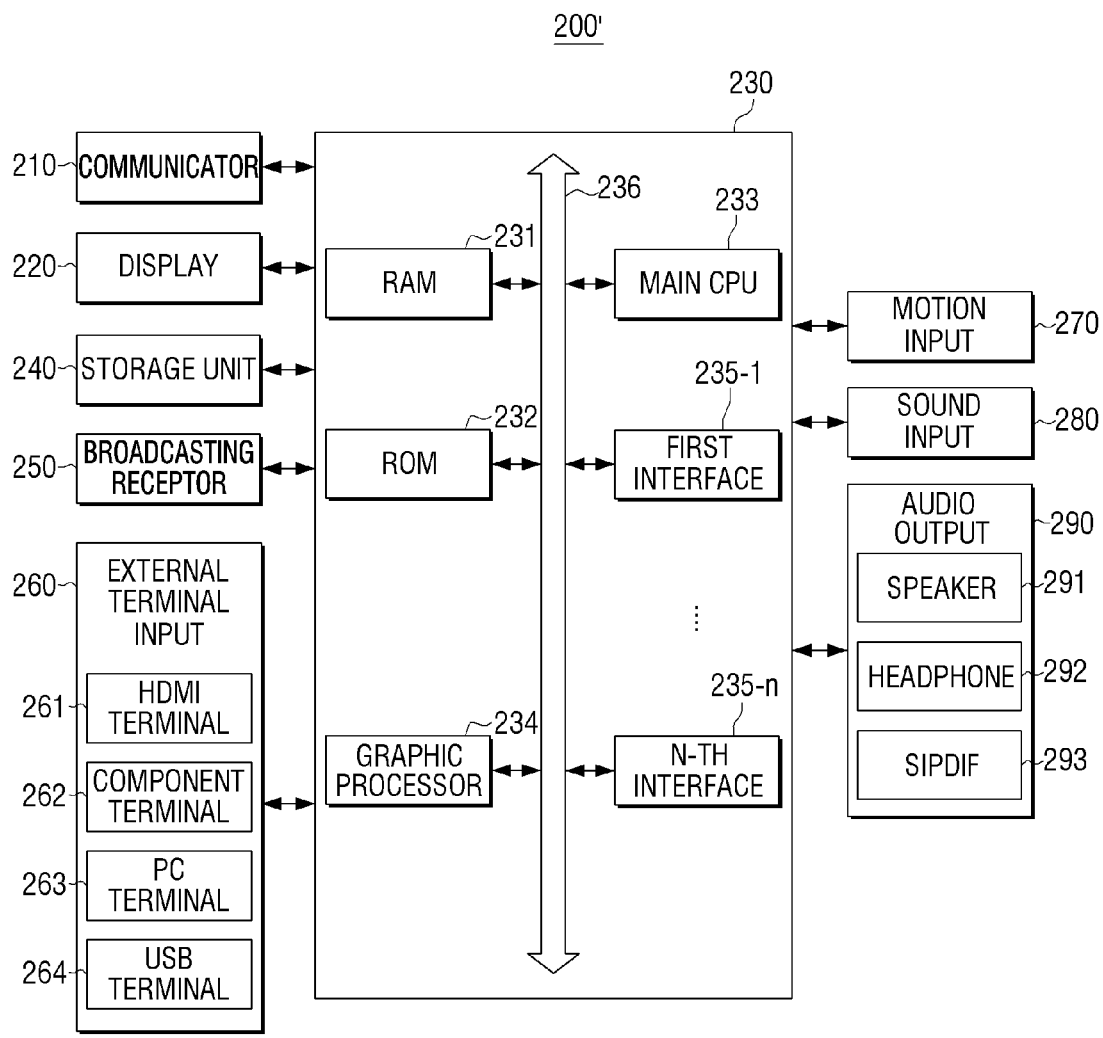
FIG. 3B is a block diagram illustrating a configuration of a display apparatus according to another exemplary embodiment.

Further, according to another exemplary embodiment, when two or more characters are continuously recognized within a preset time, the controller 230 may recognize the characters as a set of characters and perform a corresponding function. For example, when the number "7" is recognized in a state in which a specific broadcasting signal is selected and displayed, and then the number "2" is recognized within the preset time, the controller 230 may recognize the numbers as a set of characters and perform the channel change to the broadcasting channel corresponding to the recognized number "72". FIG. 3B is a block diagram illustrating a configuration of a display apparatus 200' according to an exemplary embodiment. Referring to FIG. 3B, the display apparatus 200' may include a communicator 210, a display 220, a controller 230, a storage unit 240, a broadcasting receptor 250, an external apparatus input unit 260, a motion input 270, a sound input 280, and an audio output 290.

Detailed description of portions of components illustrated in FIG. 3B which are substantially similar to corresponding components illustrated in FIG. 3A will be omitted.

The controller 230 may include a RAM 231, a ROM 232, a main CPU 233, a graphic processor 234, first to n-th interfaces 235-1 to 235-n, and a bus 236.

The ROM 231, the RAM 232, the main CPU, the graphic processor 234, the first to n-th interfaces 235-1 to 235-n, and the like may be connected to each other through the bus 236.

The first to n-th interfaces 235-1 to 235-n are connected to the above-described components. One of the interfaces may be a network interface connected to an external apparatus through a network.

The main CPU 233 may access the storage unit 240, and may perform booting using an operating system (O/S) stored in the storage unit 240. The main CPU 233 may perform various operations using various programs, content, data, and the like stored in the storage unit 240.

A command set for system booting and the like may be stored in the ROM 232. Thus, when a turn-on command is input and power is supplied, the main CPU 233 may copy the O/S stored in the storage unit 240 to the RAM 231 according to a command stored in the ROM 232, and execute the O/S to boot the system. When the booting is completed, the main CPU 143 may copy various application programs stored in the storage unit 240 to the RAM 231, and execute the application programs copied to the RAM 231 to perform various operations.

The graphic processor 234 may be configured to generate a screen including various objects such as an icon, an image, or text using an operation unit and a rendering unit. The operation unit may calculate attribute values such as coordinate values, in which the objects are displayed according to a layout of a screen, shapes, sizes, and colors. The rendering unit may generate a screen having various layouts including the objects based on the attribute values calculated in the operation unit. The screen generated in the rendering unit is displayed in a display area of the display 220. For example, the graphic processor 234 may generate a user interface (UI) screen including a dragging trajectory based on coordinate data received from an input apparatus.

The storage unit 240 may store a variety of programs and data for driving the display apparatus 200'.

In particular, the storage unit 240 may store a character recognition module configured to perform character recognition. Specifically, the storage unit 240 may store the character recognition module including a variety of character data, a variety of data for character recognition, such as a feature of the character data or coordinate data of the character data, and software including an algorism and the like for performing the character recognition using the corresponding data.

The broadcasting receptor 250 may receive a broadcast signal from the outside in a wired or wireless manner. The broadcast signal may include video, audio, and additional data (for example, an electronic program guide (EPG)). The broadcasting receptor 250 may receive a broadcast signal from various sources such as terrestrial broadcasting, cable broadcasting, satellite broadcasting, or Internet broadcasting.

The external terminal input 260 may receive video data (for example, moving image picture, and the like), audio data (for example, music, and the like), or the like from outside of the display apparatus 200. The external terminal input 260 may include at least one from among a high-definition multimedia interface (HDMI) input terminal, a component input terminal, a personal computer (PC) input terminal, or a universal serial bus (USB) input terminal.

The motion input 270 may receive a video signal (for example, consecutive frames) in which a user's motion is imaged, and provide the video signal to the controller 230. For example, the motion input 270 may be implemented with a camera unit configured of a lens and an image sensor.

The sound input 280 receives sound uttered by, for example, the user. The sound input 280 converts the input sound signal into an electrical signal and output the electrical signal to the controller 230. The sound input 280 may be implemented with a microphone.

The motion input 270 and the sound input 280 may be implemented to be integrated into the display apparatus 200' or implemented in a separate form from the display apparatus 200'. The separate motion input 270 or sound input 280 may be connected to the display apparatus 200' through a wired or wireless network.

Accordingly, if a user's motion or a user's sound is input from the motion input 270 and the sound input 280, the controller 230 may recognize a motion or sound using a motion recognition module and a motion data base stored in the storage unit 240 or by using a sound recognition module and a sound data base stored in the storage unit 240.

The audio output 290 outputs sound corresponding to a broadcast signal under control of the controller 230. The audio output 290 may include any one among a speaker 291, a headphone output terminal 292, and a Sonly/Philips Digital Interface (S/PDIF) output terminal 293.

Figure 4:
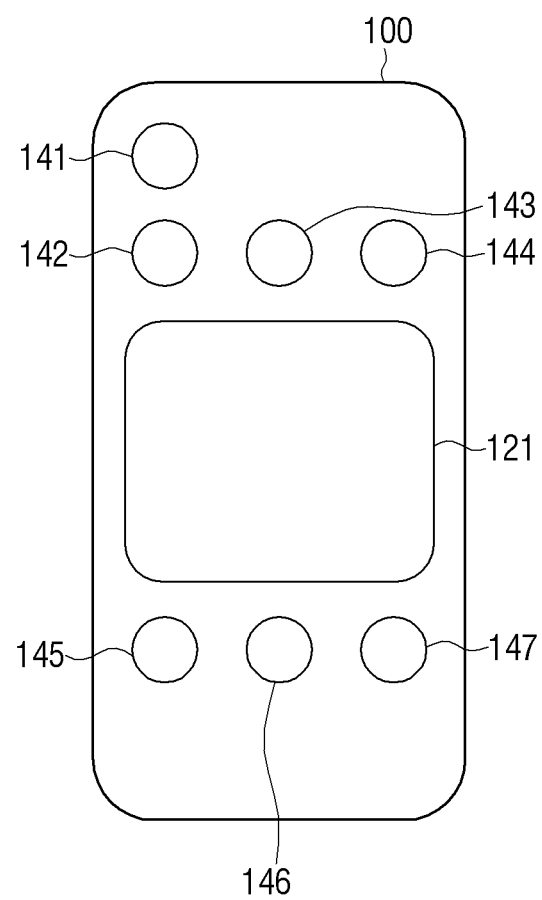
FIG. 4 is a schematic diagram illustrating an input apparatus according to an exemplary embodiment.

FIG. 4 is a schematic diagram illustrating an input apparatus according to an exemplary embodiment.

As illustrated in FIG. 4, an input apparatus 100 may include a touch pad 121 configured to receive various touch operations and a plurality of buttons 141 to 147 configured to receive other various user commands.

As illustrated in FIG. 4, the touch pad 121 may be provided in a central region of the input apparatus 100, but this is not limited thereto.

The plurality of buttons 141 to 147 may be arranged on both sides of the touch pad 121, but is not also limited thereto. The locations of the plurality of buttons 141 to 147 may be changed according to a location of the touch pad 121.

The plurality of buttons 141 to 147 may include various function buttons such as a power button, a channel up/down button, a volume button, and a menu button.

In particular, the plurality of buttons 141 to 147 may include a mode change button configured to change a button input mode to a handwriting recognition mode. Specifically, through a press operation of the mode change button, the input apparatus 100 may control a trajectory display window to be displayed in a display apparatus or the input apparatus 100 may enter the handwriting recognition mode for transmitting a touch trajectory input on the touch pad 121 to the display apparatus. The mode change button has been described above, and thus detailed description thereof will be omitted. However, this is merely exemplary, and the handwriting recognition mode may be performed not by a separate mode change button but an input of a preset touch trajectory.

Figure 5A:
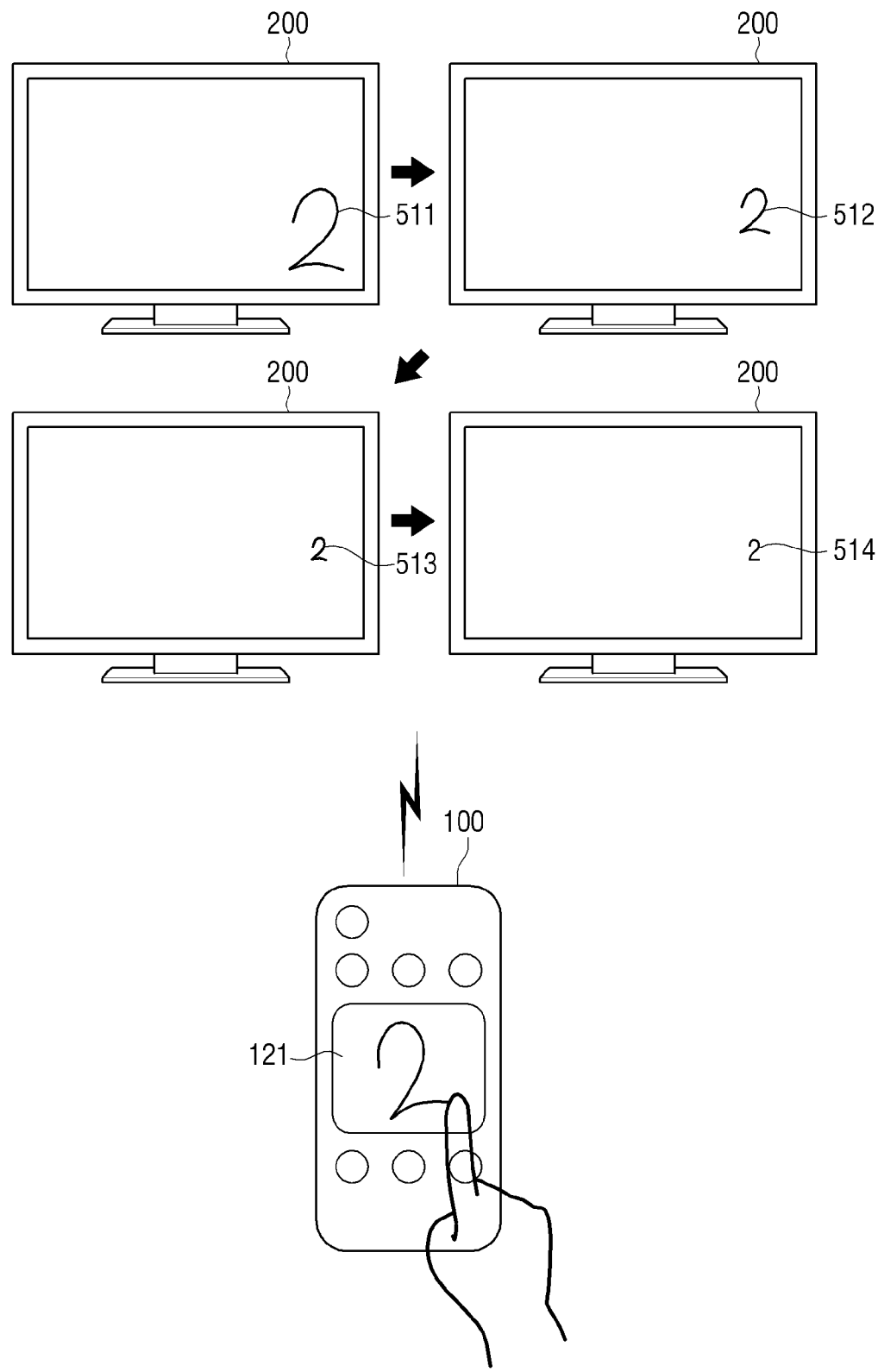
FIGS. 5A and 5B are views illustrating display methods according to one or more exemplary embodiments.
Figure 5B:
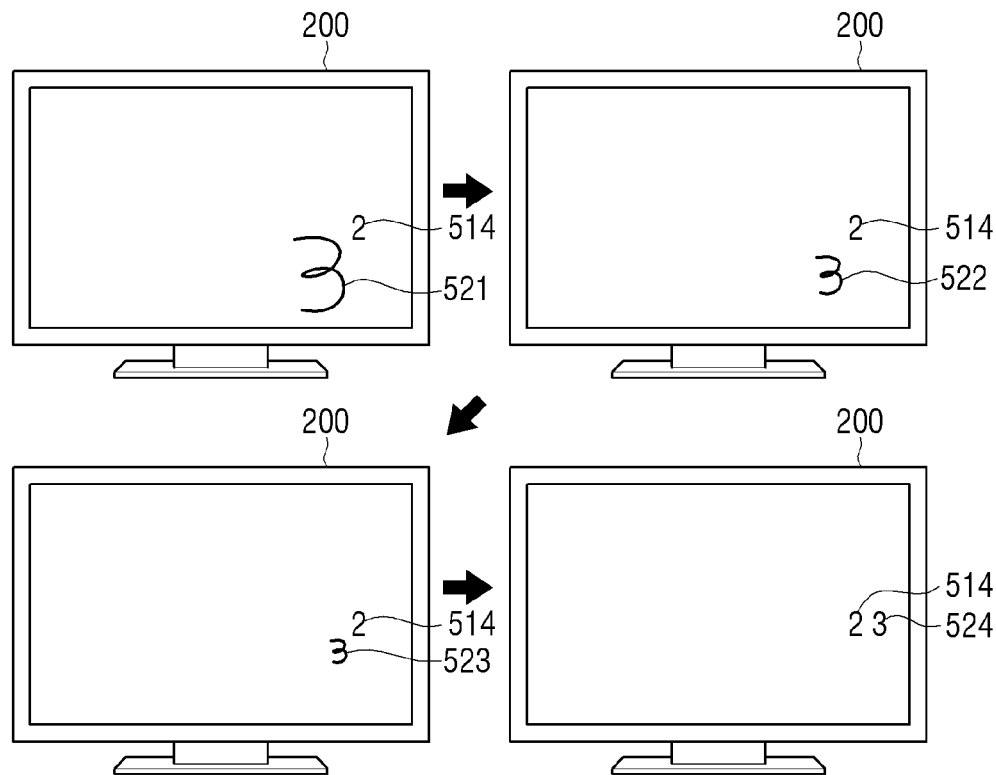
Figure 5B:
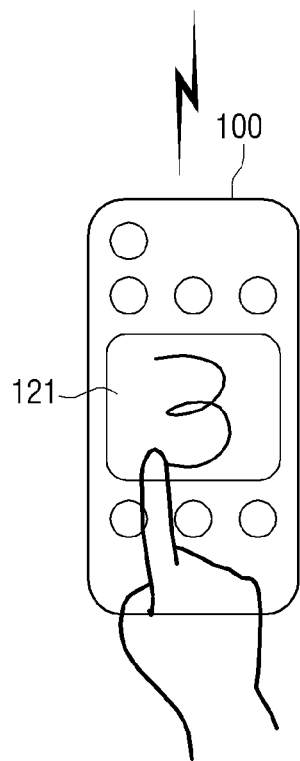

FIGS. 5A and 5B are views illustrating display methods according to an exemplary embodiment.

As illustrated in FIG. 5A, when a user operation involving touch and drag is input on a touch pad 121 provided in an input apparatus 100, the input apparatus 100 calculates coordinate data corresponding a dragging trajectory according to the user operation, and transmits the calculated coordinate data to a display apparatus 200.

A dragging trajectory 511 corresponding to the received coordinate data is displayed in the display apparatus 200. At this time, the display apparatus 200 may display the dragging trajectory 511 as it is based on the received coordinate data or correct the dragging trajectory into a smooth curved line and display the corrected dragging trajectory.

Subsequently, the display apparatus 200 may provide a variety of visual feedback for the displayed dragging trajectory 511 according to a character recognition result for the displayed dragging trajectory 511.

For example, as illustrated in FIG. 5A, when the dragging trajectory 511 is recognized as a preset character, the display apparatus 200 may display the dragging trajectory 511 to 514 while the display apparatus 200 gradually reduces a size of the dragging trajectory and sequentially moves the dragging trajectory upward. At this time, the display apparatus 200 may display the dragging trajectory 514 not in a handwriting style but in a preset font form at a final display location.

As illustrated in FIG. 5A, the input apparatus 100 may include a menu button other than the touch pad. Further, the input apparatus may also include a power button, an up/down button, or the like.

As illustrated in FIG. 5B, when consecutive touch and drag operations are input on the input apparatus 100, the input apparatus 100 may calculate coordinate data corresponding to the input dragging trajectory, and transmit the calculated coordinate data to the display apparatus 200. At this time, the display apparatus 200 may display a dragging trajectory 521 corresponding to the received coordinate data.

Subsequently, when the displayed dragging trajectory 521 is recognized as a character, the display apparatus 200 may display the dragging trajectory 521 to 524 while the display apparatus 200 gradually reduces a size of the dragging trajectory and sequentially moves the dragging trajectory upward as in FIG. 5A, and display the dragging trajectory 524 in a preset font form next the character 511 input in FIG. 5A.

Figure 6A:
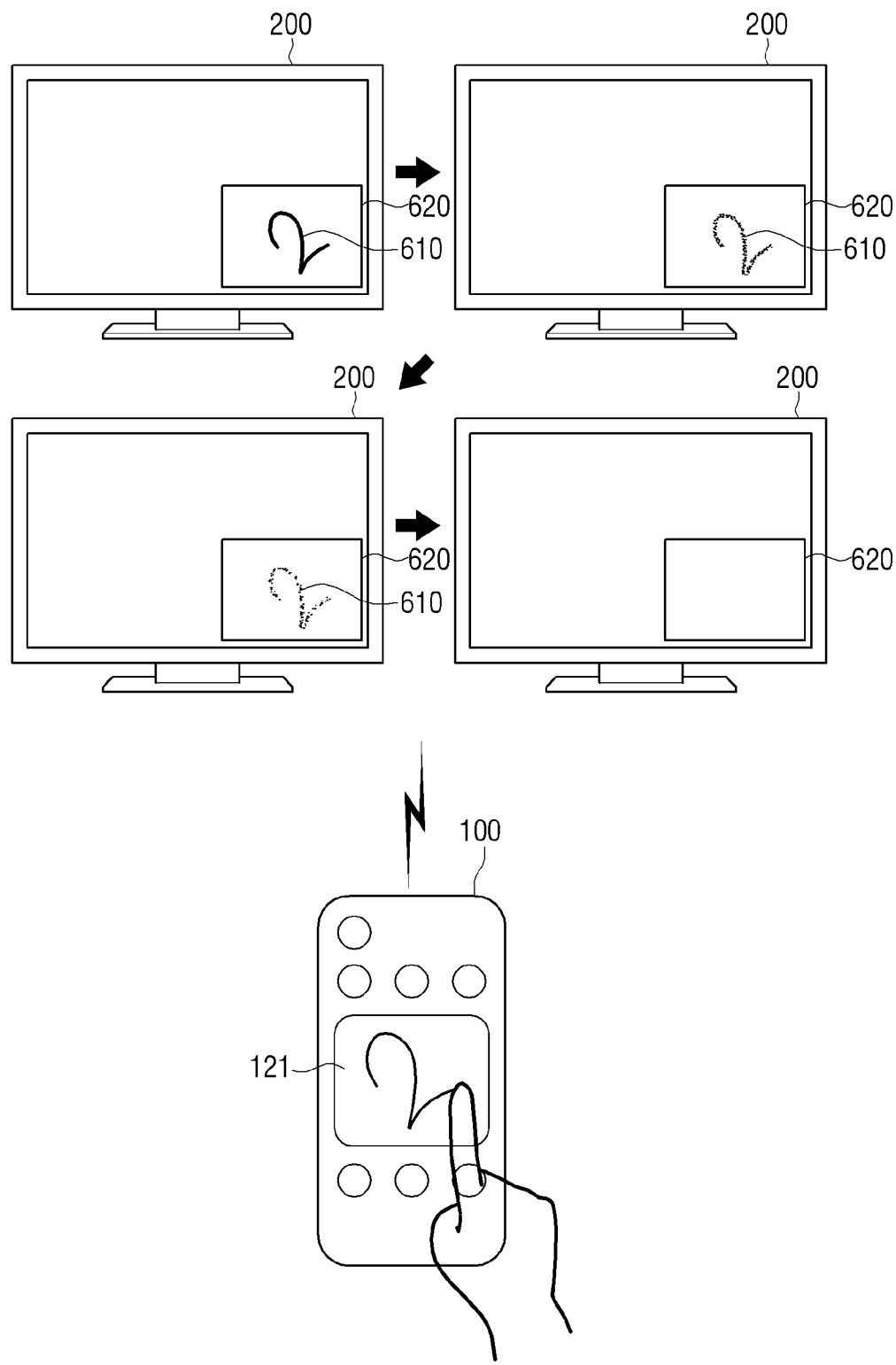
FIGS. 6A and 6B are views illustrating display methods according to one or more exemplary embodiments.
Figure 6B:
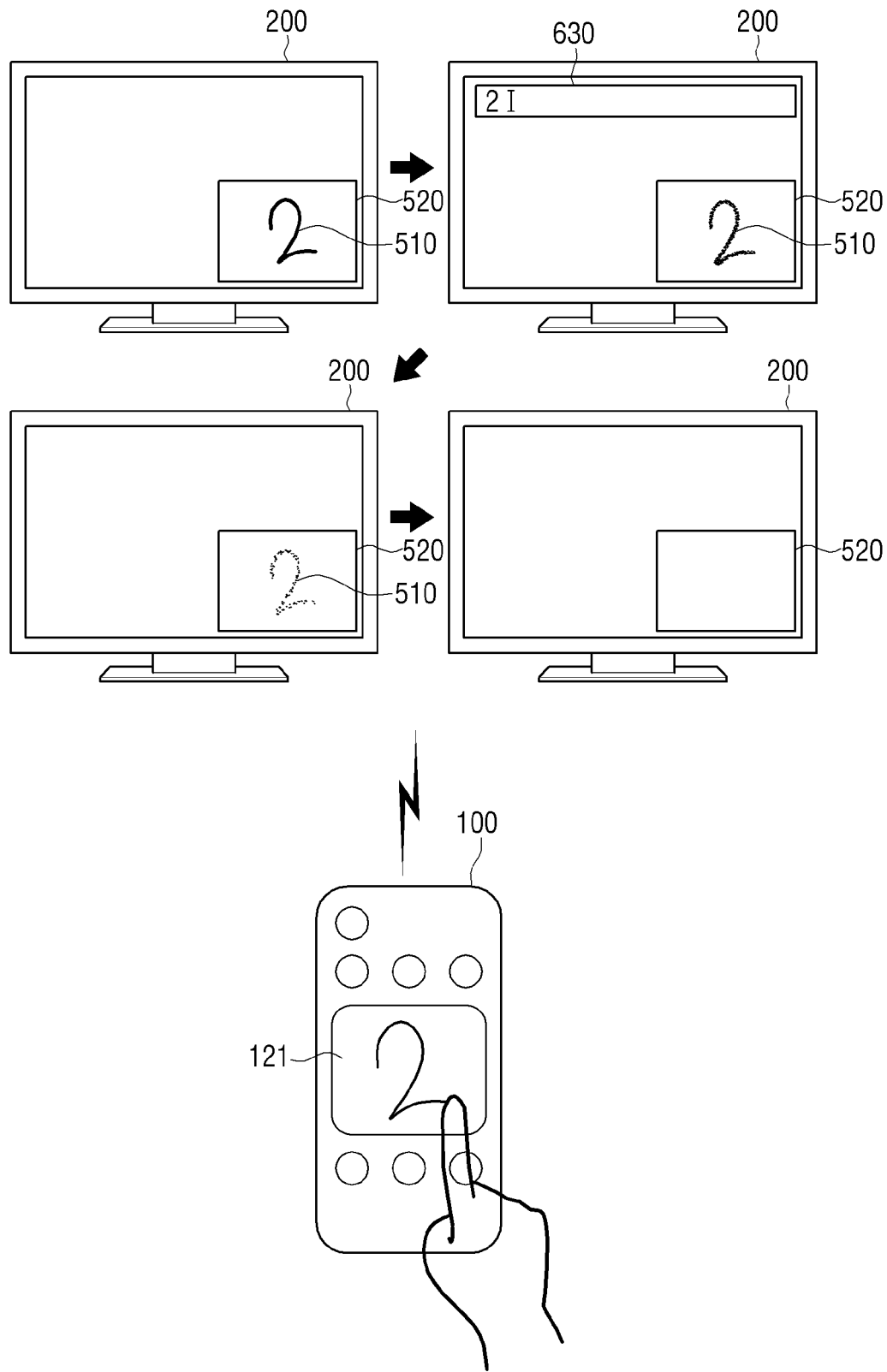

FIGS. 6A and 6B are views illustrating display methods according to another exemplary embodiment.

As illustrated in FIG. 6A, when coordinate data corresponding to a dragging trajectory 610 input through a touch pad 121 provided in an input apparatus 100 is not recognized as a preset character, a display apparatus 200 may provide visual feedback in a form in which the displayed dragging trajectory 610 dispersedly disappears after a preset time elapsed or directly.

As illustrated in FIG. 6A, a region 620 in which the dragging trajectory is displayed is a preset partial region on a screen, and the region 620 may be displayed in a form distinguished from the other region. For example, the region 620 may be displayed in an OSC form.

Although not shown in FIG. 6A, when the dragging trajectory is not recognized as a preset character, the display apparatus may provide visual feedback in a form in which a residual image for the displayed dragging trajectory is left, and the residual image disappears after a preset time elapsed or just when the residual image is displayed.

In some cases, the above-displayed visual feedback may be provided regardless of character recognition.

As illustrated in FIG. 6B, the display apparatus may provide visual feedback in a form in which the displayed dragging trajectory disappears after a preset time elapsed or just when the dragging trajectory is displayed, regardless of a recognition result of the dragging trajectory as a preset character. When the displayed dragging trajectory is recognized as a character, the recognized character may be input in a separate character write region 630 in a preset font form.

At this time, the character recognition result may be recognized according to whether or not the character is displayed in the separate character write region 630 as illustrated in FIG. 6B.

Figure 7A:
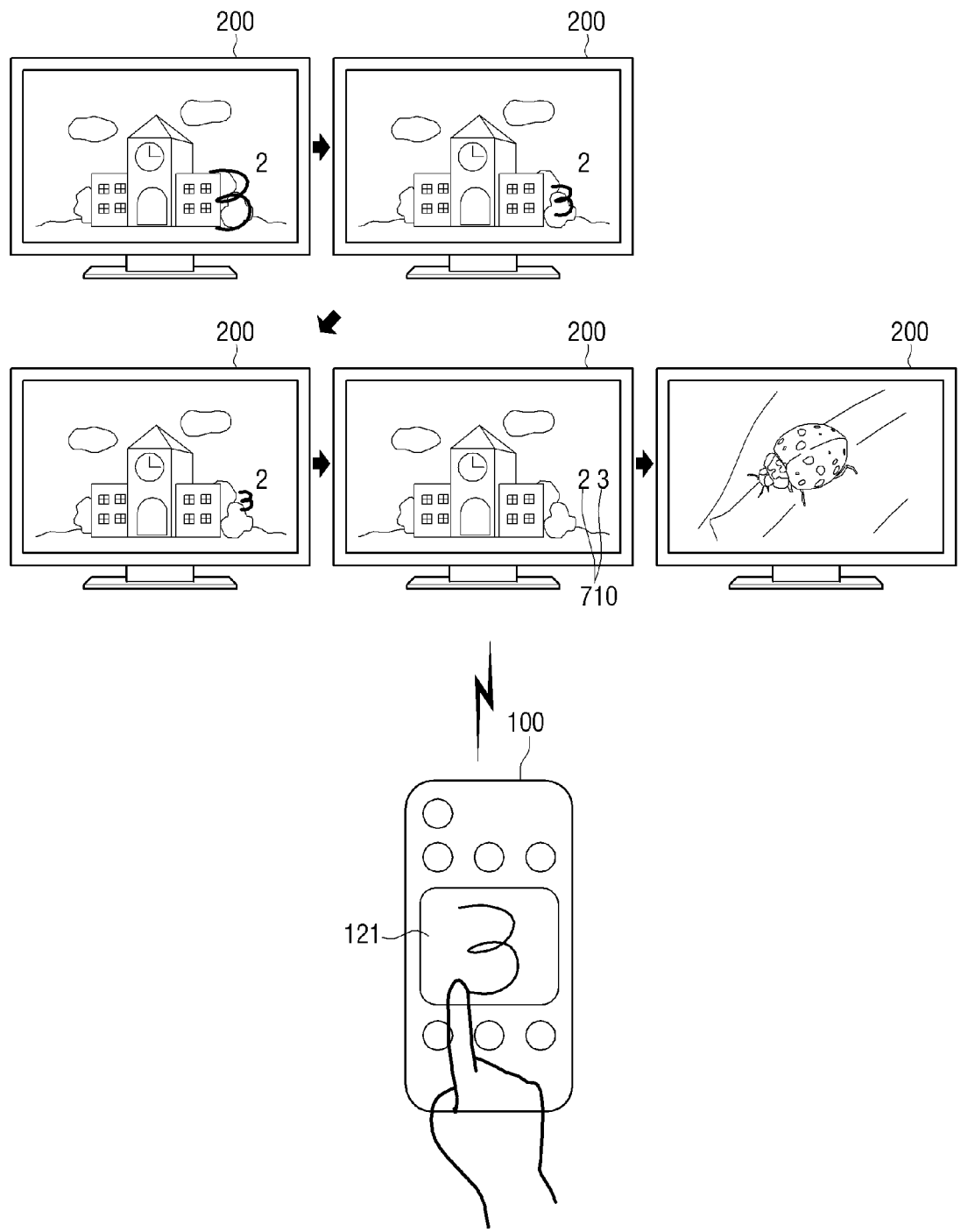
FIGS. 7A to 7C are views illustrating display methods according to one or more exemplary embodiments.
Figure 7B:
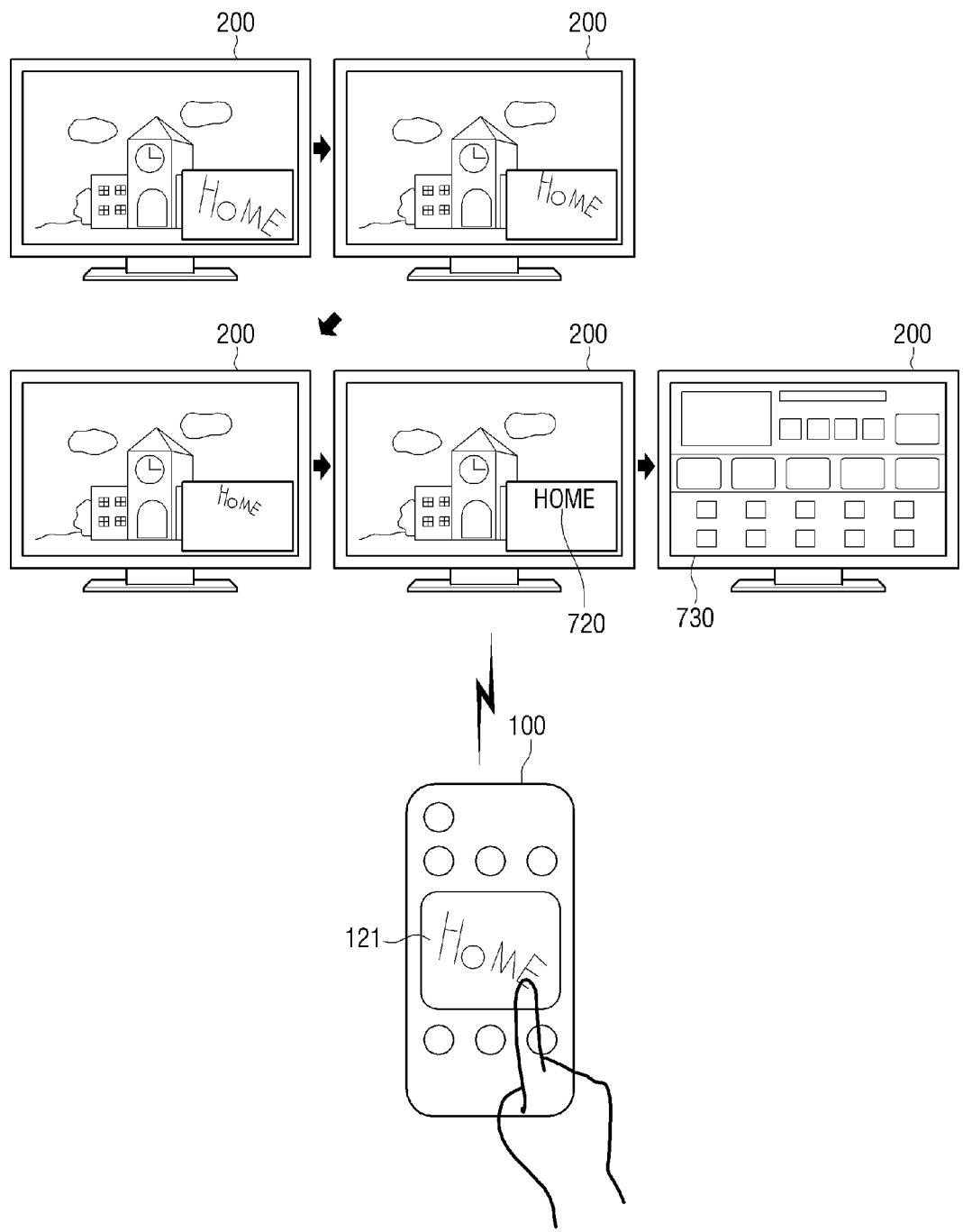
Figure 7C:
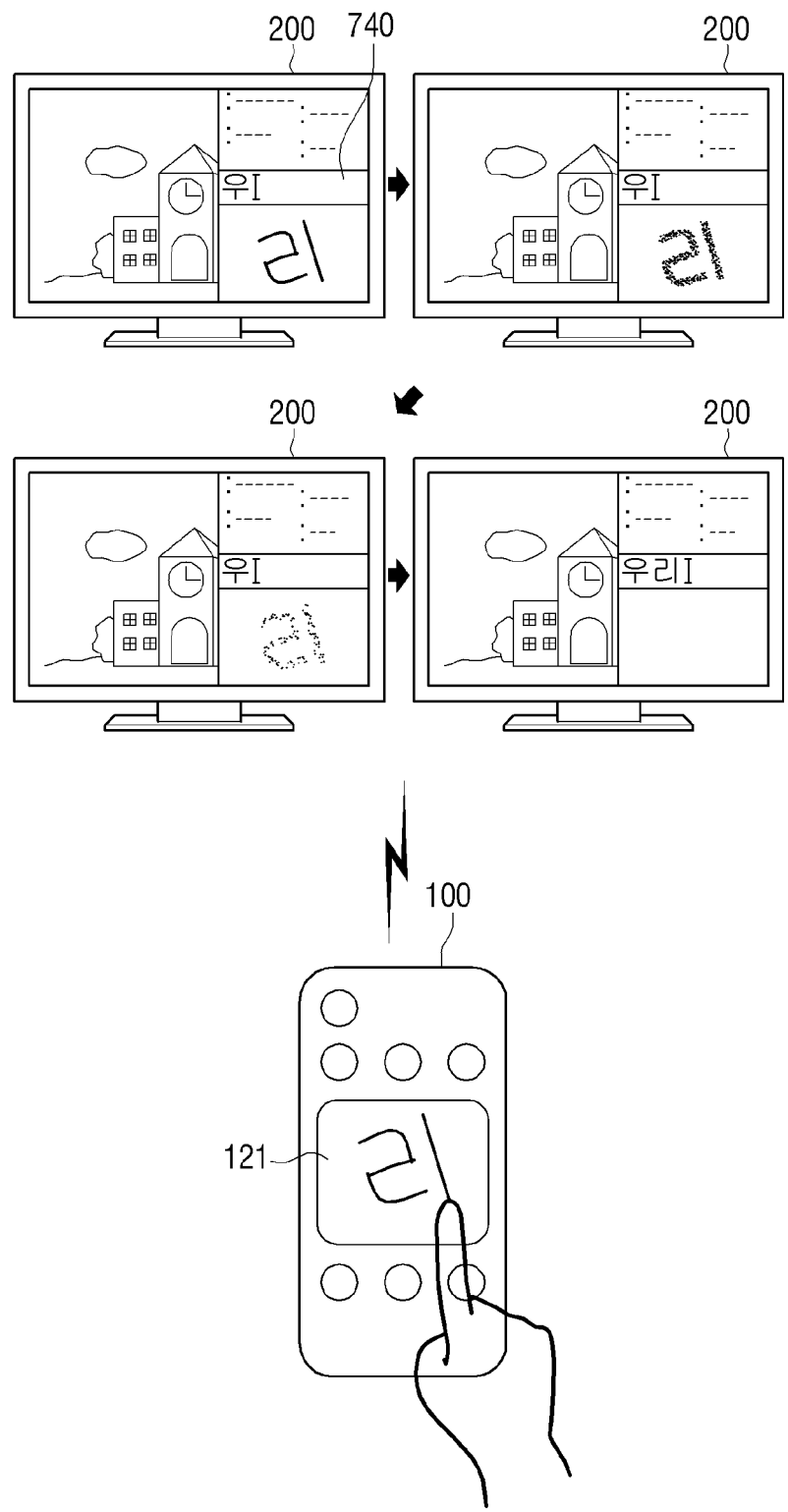

FIGS. 7A to 7C are views illustrating methods of performing a function according to character recognition according to various exemplary embodiments.

FIG. 7A is a view illustrating a channel change method according to an exemplary embodiment.

As illustrated in FIG. 7A, when a touch trajectory input through a touch pad 121 provided in an input apparatus 100 is recognized as the number "2" in a state in which a display apparatus 200 selects a preset broadcasting channel and displays a corresponding broadcasting image, and a dragging trajectory consecutively input within a preset time is recognized as the number "3", the display apparatus 200 may perform channel change to a channel corresponding to the recognized number "23". That is, the display apparatus 200 may perform a function corresponding to the recognized character based on a current operation state. However, this is merely exemplary, and in some cases, a user command (for example, a specific motion to the input apparatus 100) for channel change may be preferentially input before a touch trajectory is input through the input apparatus 100.

FIG. 7B is a view illustrating a menu execution method according to another exemplary embodiment.

As illustrated in FIG. 7B, when a touch trajectory input through a touch pad 121 provided in an input apparatus 100 is recognized as a character "home" 720 in a state in which a display apparatus 200 selects a preset broadcasting channel and displays a corresponding broadcasting image, the display apparatus 200 may display a "home" screen corresponding to the recognized character. That is, when a specific character input window (for example, an SNS input screen) is not displayed, the display apparatus 200 may perform a menu corresponding to the recognized character "home". The display apparatus may display a home screen 730.

FIG. 7C is a view illustrating a character input method according to another exemplary embodiment.

As illustrated in FIG. 7C, when a touch trajectory input through a touch pad 121 provided in an input apparatus 100 is recognized as a character "21" in a state in which an SNS input screen is executed in a display apparatus 200, the display apparatus 200 may input the recognized character to the SNS input screen 740.

Although not shown in FIG. 7C, when the touch trajectory input through the touch pad 121 provided in the input apparatus 100 is recognized as a character "motion" in a state in which the display apparatus 200 operates in a sound recognition mode, the display apparatus 200 may recognize the character "motion" as a mode change command and change the operation mode to a motion recognition mode.

The other various functions may be performed based on the recognized or number, and a corresponding function may be determined based on a current operation state of the display apparatus 200 or a function type input before the dragging trajectory input as described above.

Figure 8:
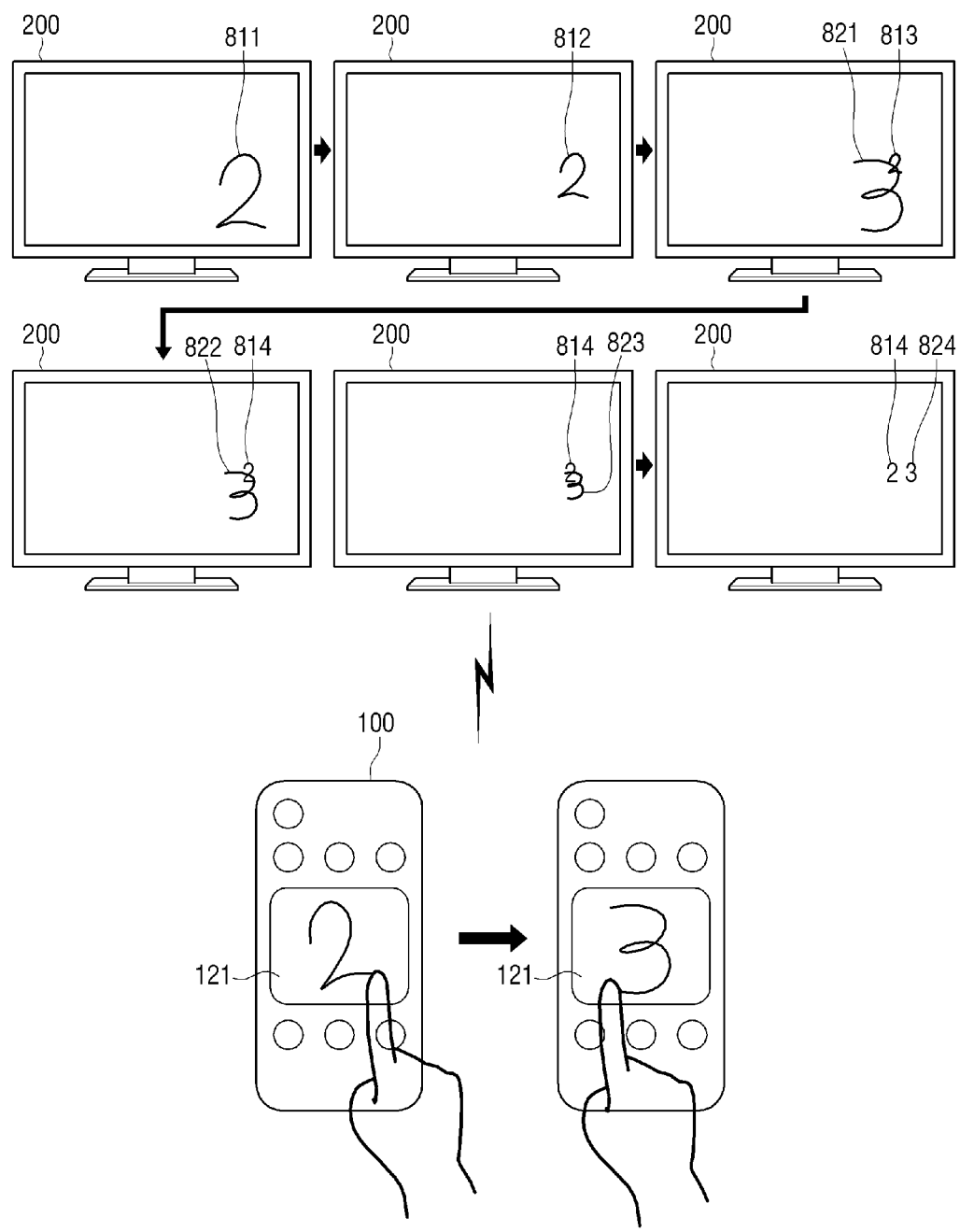
FIG. 8 is a view illustrating a display method according to another exemplary embodiment.

FIG. 8 is a view illustrating a display method according to another exemplary embodiment.

As illustrated in FIG. 8, when a dragging trajectory according to a second touch operation is input within a preset time (for example, just after input) after a dragging trajectory according to a first touch operation is input in an input apparatus 100, a display apparatus 200 may overlap the display of the visual feedback corresponding to coordinate data according to the first touch operation first received with the visual feedback corresponding to coordinate data according to the second touch operation lastly received.

That is, as illustrated in FIG. 8, while visual feedback 811 to 814 corresponding to the dragging trajectory "2" is displayed, visual feedback 821 to 824 corresponding to a dragging trajectory "3" may be displayed so that the visual feedback 821 to 824 overlaps the visual feedback 811 to 814.

Figure 9:
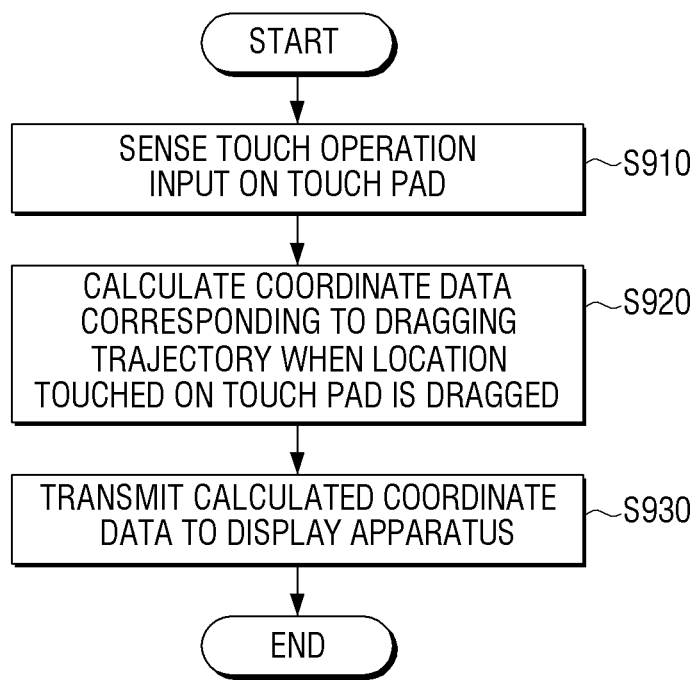
FIG. 9 is a flowchart illustrating a control method of an input apparatus according to an exemplary embodiment.

FIG. 9 is a flowchart illustrating a control method of an input apparatus according to an exemplary embodiment.

According to a control method of an input apparatus illustrated in FIG. 9, the input apparatus may sense a touch operation input on a touch pad (S910).

Next, when a location touched on the touch pad is dragged, the input apparatus may calculate coordinate data corresponding to a dragging trajectory (S920).

The input apparatus may then transmits the calculated coordinate data to a display apparatus (S930).

When calculating the coordinate data in operation S920, the coordinate data from a point in which a first touch is made to a point in which a touch is completed within a preset time may be calculated. For example, when a plurality of dragging trajectories are input within a preset time, the input apparatus may recognize coordinate data for the plurality of dragging trajectories as coordinate data for one character or number, and simultaneously transmit the coordinate data to the display apparatus. Alternatively, the input apparatus may calculate coordinate data for each of the dragging trajectories and transmit the coordinate data to the display apparatus regardless of whether or not a plurality of dragging trajectories are input within the preset time. At this time, the display apparatus may recognize the plurality of dragging trajectories as a dragging trajectory for one character or number based on a point of time when the coordinate data is received, and perform character recognition.

Here, the input apparatus may be a remote control apparatus configured to remotely control a display apparatus.

In some cases, the input apparatus may recognize a character or a number based on calculated coordinate data, and transmit a recognition result to the display apparatus. The exemplary embodiment has been described in detail, and thus detailed description thereof will be omitted.

FIG. 10 is a flowchart illustrating a control method of a display apparatus according to an exemplary embodiment.

According to a control method of a display apparatus illustrated in FIG. 10, the display apparatus may perform communication with an input apparatus, and receive coordinate data according to a dragging trajectory input to a touch pad provided in the input apparatus (S1010).

Next, the display apparatus displays the dragging trajectory on a screen based on the received coordinate data (S1020).

The display apparatus recognizes a character or a number corresponding to the dragging trajectory based on the received coordinate data, and provides visual feedback to the displayed dragging trajectory according to a recognition result (S1030).

Specifically, when providing the visual feedback in operation S1030, the display apparatus may provide different visual feedback when the dragging trajectory is recognized as a character or a number, and when the dragging trajectory is not recognized as a character or a number.

Specifically, when providing the visual feedback, the display apparatus may display the dragging trajectory by gradually reducing the displayed dragging trajectory and simultaneously by sequentially moving a display location toward one side when the dragging trajectory is recognized as a character. For example, the display apparatus may display the dragging trajectory by moving the location of the dragging trajectory upward.

In when providing the visual feedback, the display apparatus may display the dragging trajectory at a final location in which the dragging trajectory is displayed in a preset font form.

Further, when providing the visual feedback, the display apparatus may provide a graphic effect in a form in which the displayed dragging trajectory dispersedly disappears when the dragging trajectory is not recognized as a character.

In the above-described exemplary embodiments, it is assumed and described that an input apparatus and a display apparatus configured to display an input result are implemented with separate apparatuses. In some cases, the technical feature described above may be applied to an example in which the input apparatus and the display apparatus are integrally implemented.

Further, a learning effect for a handwriting input through a touch may be provided to a user. For example, when the handwriting inputs through the touch, a suitable delay is provided by visual feedback and thus a learning effect for a method of inputting a character one by one may be naturally provided. Further, a user can recognize a period of time from a recognition start point of time to a recognition stop point of time through dragging trajectory display and visual feedback provision, and thus user can naturally learn an input timing.

Further, according to another exemplary embodiment, the input time allotted for detecting a character based on a dragging input may be paused when it is detected that such an input is being received at an input device. Then a post input grace time, or delay, may be provided for the user to enter another character. Thus, this provides a user with the ability to take variable amount of time for drawings each separate character benefiting both fast and slow input.

The control methods of an input apparatus and a display apparatus according to the above-described exemplary embodiments may be implemented with a program and provided to input apparatuses and display apparatuses.

As an example, a non-transitory computer-recordable medium, in which a program for performing a method of calculating coordinate data according to a dragging trajectory when a location touched on a touch pad is dragged, and transmitting the calculated coordinate data to a display apparatus is stored, may be provided.

The non-transitory computer-recordable medium is not a medium configured to temporarily store data such as a register, a cache, or a memory but an apparatus-readable medium configured to semi-permanently store data. Specifically, the above-described various applications or programs may be stored and provided in the non-transitory apparatus-readable medium such as a compact disc (CD), a digital versatile disc (DVD), a hard disc, a Blu-ray disc, a universal serial bus (USB), a memory card, a ROM, and the like.

The foregoing exemplary embodiments and advantages are merely exemplary and are not to be construed as limiting the present inventive concept. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A display apparatus, comprising:
   a communicator configured to communicate with an input apparatus comprising a touch pad, and receive coordinate data corresponding to a dragging trajectory input through the touch pad;
   a display configured to display the dragging trajectory on a screen based on the received coordinate data; and
   a controller configured to recognize a character corresponding to the dragging trajectory based on the received coordinate data, and provide a visual feedback adjusting the displayed dragging trajectory according to whether the character is recognized,
   wherein the controller is further configured to provide a first type of the visual feedback when the dragging trajectory is recognized as the character, and provide a second type of the visual feedback when the dragging trajectory is not recognized as the character, the second type of the visual feedback being different from the first type of the visual feedback,
   wherein the controller is further configured to determine a type of a function to be performed corresponding to the recognized character, determination being based on a current operation state of the display apparatus without a user manipulation, and
   wherein the controller is further configured to perform a first function corresponding to the recognized character according to a first operation state of the display apparatus, the first function being one of a channel change, a character input, a menu execution, a mode change, and a volume adjustment, and perform a second function corresponding to the recognized character according to a second operation state of the display apparatus, the second function being another one of the channel change, the character input, the menu execution, the mode change, and the volume adjustment.

2. The display apparatus as claimed in claim 1, wherein the controller is further configured to control the display to display the dragging trajectory in a gradually reduced size, and sequentially move a display location of the dragging trajectory on the screen in response to the dragging trajectory being recognized as the character.

3. The display apparatus as claimed in claim 2, wherein the controller is further configured to control the display to display the dragging trajectory at a preset location of the screen in a preset font form.

4. The display apparatus as claimed in claim 1, wherein the controller is further configured to provide a graphic effect in a form in which the displayed dragging trajectory gradually disappears dispersedly in response to the dragging trajectory not recognized as the character.

5. A method of controlling a display apparatus, the method comprising:
   performing communication with an input apparatus;
   receiving coordinate data that corresponds to a dragging trajectory that is input on a touch pad provided in the input apparatus;
   displaying the dragging trajectory on a screen of the display apparatus based on the coordinate data;
   providing a visual feedback corresponding to the displayed dragging trajectory according to whether a character is recognized; and
   determining a type of a function to be performed and performing the function corresponding to the recognized character, the determining being based on a current operation state of the display apparatus without a user manipulation, wherein the providing of the visual feedback comprises providing a first type of the visual feedback when the dragging trajectory is recognized as the character and providing a second type of the visual feedback when the dragging trajectory is not recognized as the character, the second type of the visual feedback being different from the first type of the visual feedback, and wherein performing the function comprises performing a first function corresponding to the recognized character according to a first operation state of the display apparatus, the first function being one of a channel change, a character input, a menu execution, a mode change, and a volume adjustment, and performing a second function corresponding to the recognized character according to a second operation state of the display apparatus, the second function being another one of the channel change, the character input, the menu execution, the mode change, and the volume adjustment.

6. The method as claimed in claim 5, wherein the providing of the visual feedback further includes displaying the dragging trajectory in a gradually reduced size, and sequentially moving a display location in response to the dragging trajectory being recognized as the character.

7. The method as claimed in claim 6, wherein the providing of the visual feedback further includes displaying the dragging trajectory at a preset location of the screen in a preset font form.

8. The method as claimed in claim 5, wherein the providing of the visual feedback further includes providing a graphic effect in a form in which the displayed dragging trajectory gradually disappears dispersedly in response to the dragging trajectory not being recognized as the character.

9. A touch input display system comprising:
an input device configured to receive a touch input and calculate a path of the touch input comprising:
  a touch pad configured to receive the touch input;
  a processor configured to calculate the path of the touch input on the touch pad; and
  a transmitter configured to transmit the path; and
a display device comprising:
  a screen configured to display the path transmitted from the transmitter of the input device; and
  a controller configured to detect a character based on the path,
  wherein the screen is further configured to transition from displaying the path to displaying a visual feedback,
  wherein the visual feedback includes providing a first type of the visual feedback in response to the character being detected and a second type of the visual feedback in response to the character not being detected, and
  wherein the controller is further configured to determine a type of a function to be performed corresponding to the detected character, determination being based on a current operation state of the display device without a user manipulation, and
  wherein the controller is further configured to perform a first function corresponding to the detected character according to a first operation state of the display device, the first function being one of a channel change, a character input, a menu execution, a mode change, and a volume adjustment, and perform a second function corresponding to the detected character according to a second operation state of the display device, the second function being another one of the channel change, the character input, the menu execution, the mode change, and the volume adjustment.

10. The touch input display system of claim 9, wherein the visual feedback includes at least one of displaying using a specific font format, at a specific size, at a specific location on the screen, and a gradual disappearance of the path.

* * * * *